United States Patent [19]

Wiese

[11] Patent Number: 5,785,404
[45] Date of Patent: Jul. 28, 1998

[54] LOCALIZED ILLUMINATION DEVICE

[75] Inventor: Lynn Wiese, Santa Clara, Calif.

[73] Assignee: Siemens Microelectronics, Inc., Cupertino, Calif.

[21] Appl. No.: 496,821

[22] Filed: Jun. 29, 1995

[51] Int. Cl.⁶ .................................................... F21V 7/04
[52] U.S. Cl. .......................... 362/32; 362/61; 362/80; 362/800
[58] Field of Search ............................ 362/32, 61, 80, 362/83.3, 240, 800, 31

[56] References Cited

U.S. PATENT DOCUMENTS

| | | | |
|---|---|---|---|
| 4,337,759 | 7/1982 | Popovich et a ................. | 126/684 |
| 4,767,172 | 8/1988 | Nichols et al. . | |
| 5,027,258 | 6/1991 | Schöniger et al. ............. | 362/800 X |
| 5,130,761 | 7/1992 | Tanaka ............................ | 362/800 X |
| 5,173,810 | 12/1992 | Yamakawa . | |
| 5,268,823 | 12/1993 | Yergenson . | |
| 5,278,545 | 1/1994 | Streck . | |
| 5,303,125 | 4/1994 | Miller ............................. | 36/32 |
| 5,365,412 | 11/1994 | Koppolu et al. ............... | 362/32 |
| 5,404,869 | 4/1995 | Parkyn, Jr. et al. . | |

FOREIGN PATENT DOCUMENTS 2 682 458 A1  4/1993  France .
2 261 279     5/1993  United Kingdom .

OTHER PUBLICATIONS

International Search Report for application No. PCT/US96/03526, international file date Mar. 14, 1996.
International Search Report for application No. PCT/US96/03530, international filing date Mar. 14, 1996.

*Primary Examiner*—Larry Jones

[57] ABSTRACT

Illumination apparatus for use in localized illumination applications, such as an automobile dashboard. The apparatus includes a light emitting diode mounted on a metallized circuit board; a TIR lens mounted over the light emitting diode to collect light emitted from the light emitting diode and to direct the light in a single direction; and a light pipe disposed over the light emitting diode and the TIR lens. The light pipe has walls extending from the circuit board to a plane above the circuit board such that directed light from the TIR lens is channeled through the light pipe to the plane. The apparatus can also include a cover disposed in the plane over the light pipe. The cover may be integrally molded to the light pipe and have an icon configured therein, such that the icon is illuminated by the light from the light emitting diode. A lens may also be placed over the cover of the light pipe to create a focused image of the icon, thereby maximizing the light emitted by the light emitting diode at the focused image.

32 Claims, 4 Drawing Sheets

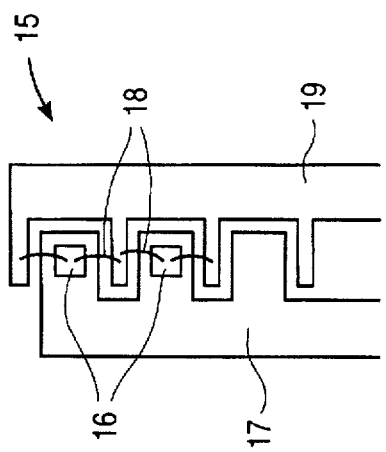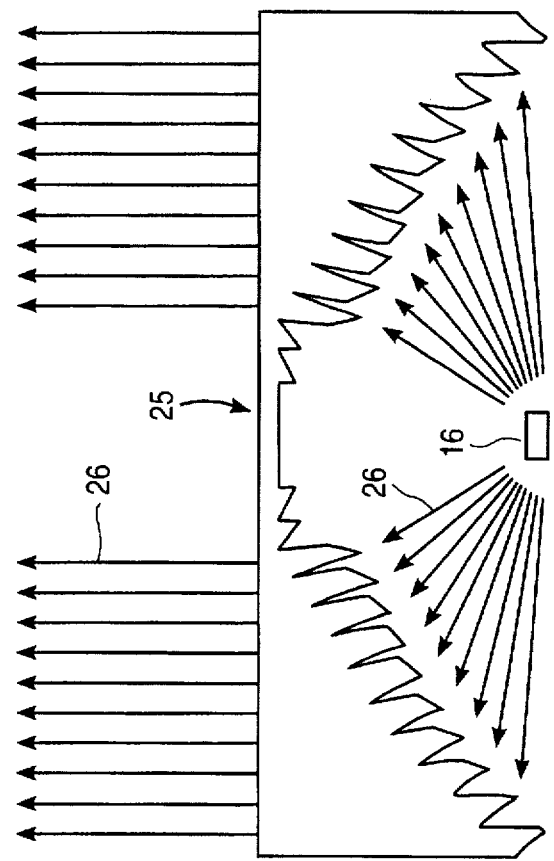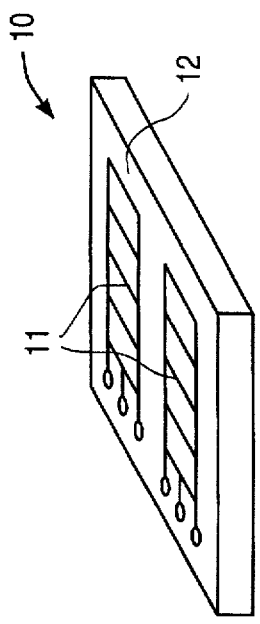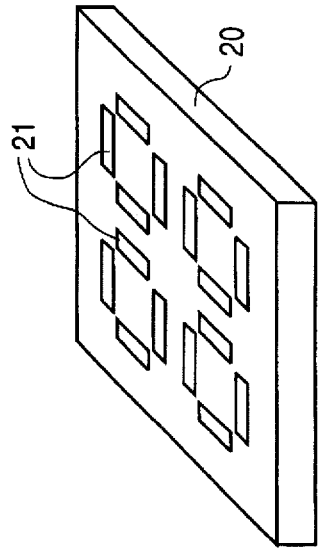

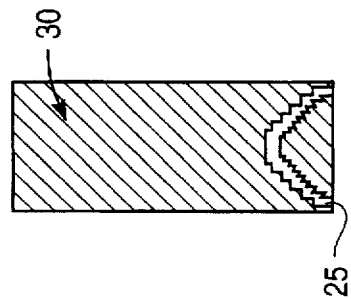
FIG_3B
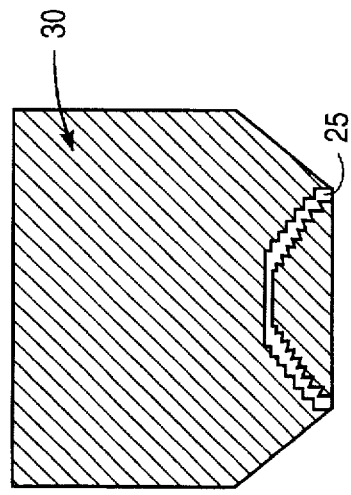
FIG_4A
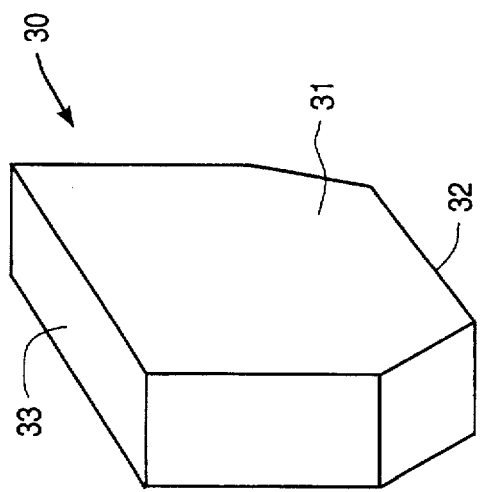
FIG_5
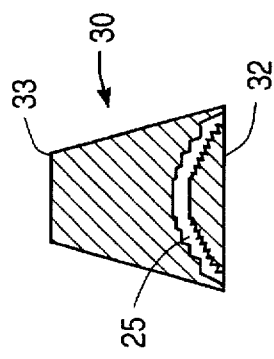
FIG_4B
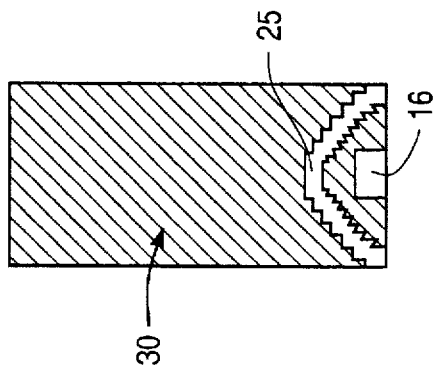
FIG_7
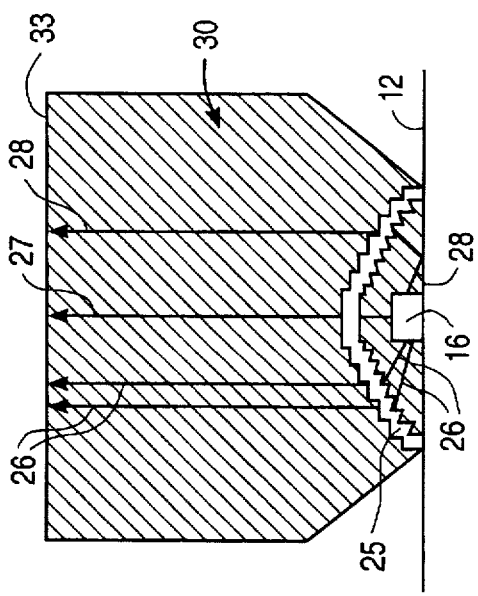
FIG_6

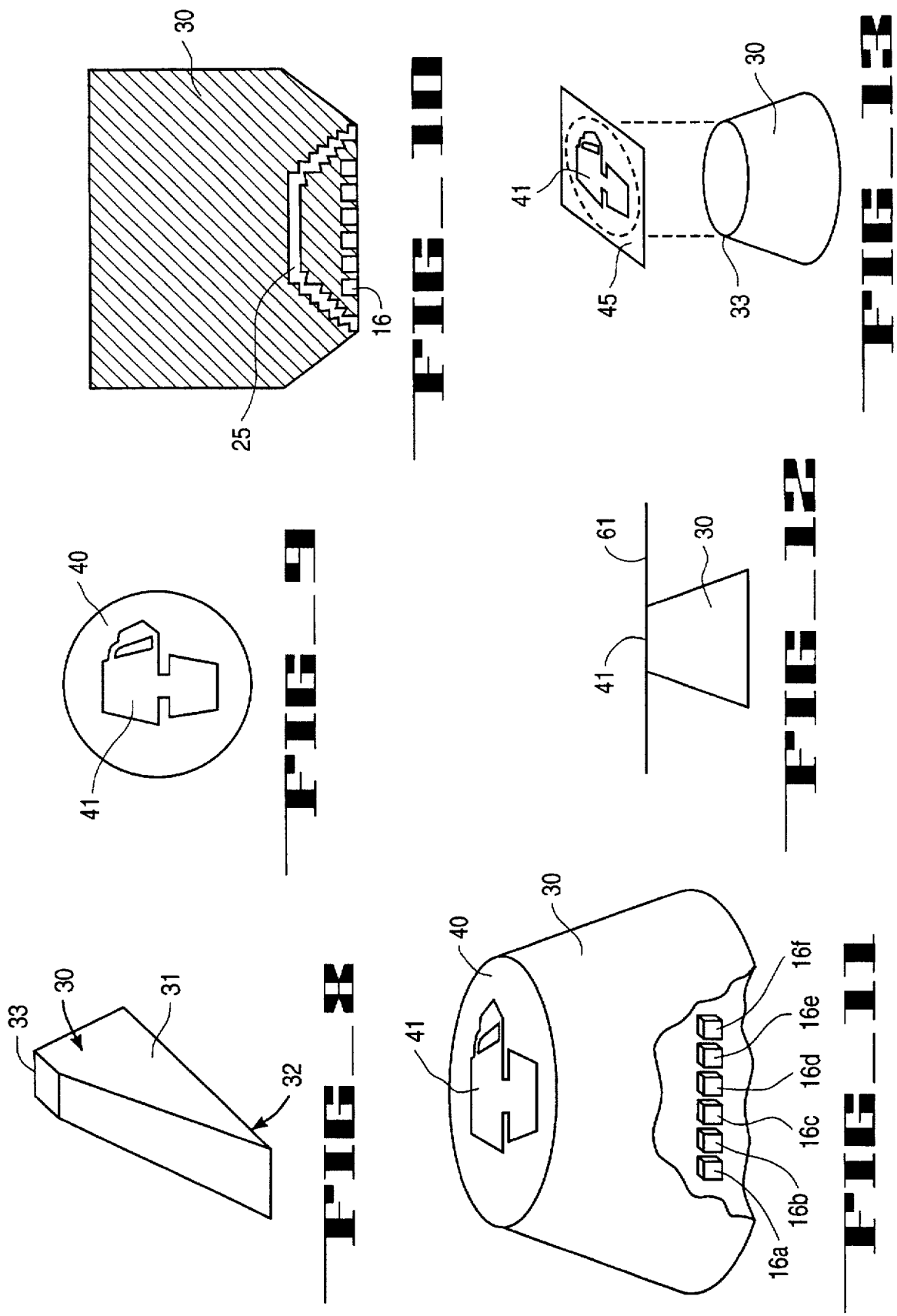

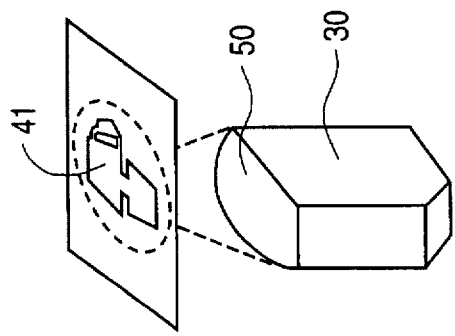
FIG_15
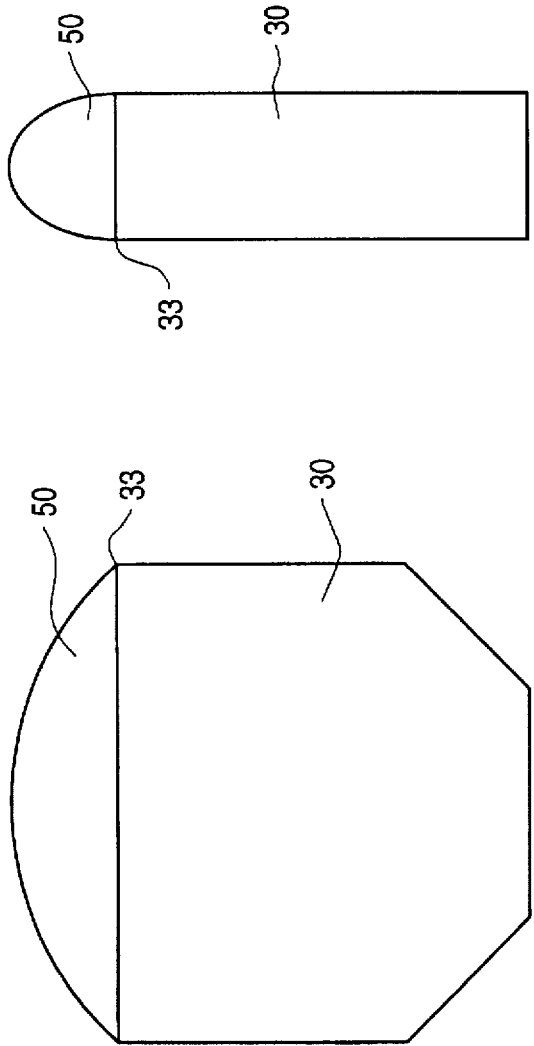
FIG_14
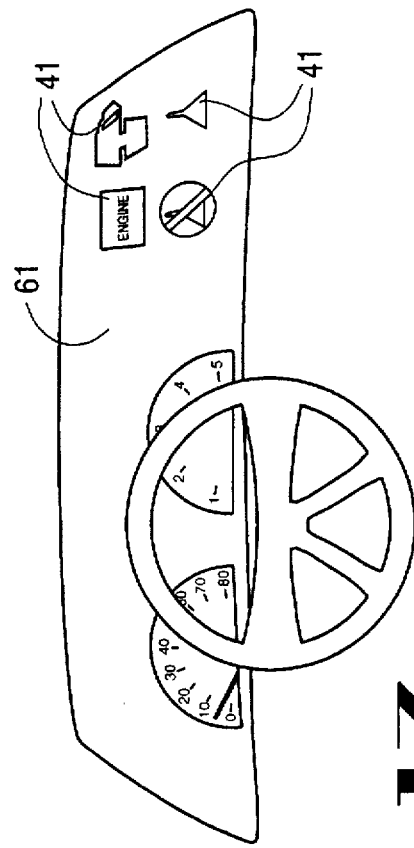
FIG_17

LOCALIZED ILLUMINATION DEVICE

FIELD OF THE INVENTION

A related application entitled "LOCALIZED ILLUMINATION USING TIR TECHNOLOGY" by the same inventor, is being filed on the same day herewith and is incorporated by reference herein.

This invention relates to illumination devices and, more particularly, to a localized illumination device that uses total internal reflection (TIR) technology.

BACKGROUND OF THE INVENTION

Localized illumination is used in a variety of applications in which numbers, shapes, designs, icons, or other figures are to be illuminated against a background of relatively darker shade. Examples of localized illumination applications include lighting icons on computer screens, cameras, video cameras, stereos, household appliances, and various industrial uses, among many others.

A particular application of localized illumination is in automobile dashboard lighting. A typical automobile dashboard contains a variety of discrete elements that may be illuminated for observation by someone within the vehicle. Elements that might be illuminated include, for example, icons of gas pumps, oil cans, persons in seatbelts, or messages such as "check engine," "check oil," and "fasten safety belt." Individual elements of digits in a digital display of speed, revolutions per minute, miles per gallon, or gallons in gas tank also require localized lighting.

One alternative to a conventional automobile dashboard is a "heads-up" display in which an icon is reflected off the inside of a windshield using vacuum florescent displays. Such displays also use localized illumination, but, require extremely high power.

Localized illumination for automobile dashboard lighting is commonly accomplished using ordinary lamps situated in wells formed in the dashboard base structure. Although lamps can be selected that emit light in a forward direction (that is, from the light source toward the plane of the object to be illuminated), there is always some light emitted laterally. The laterally-emitted light of a lamp may combine with the laterally-emitted light of adjacent lamps, thereby creating areas of increased light, or light "hot spots," within the dashboard enclosure. Such hot spots are undesirable because of the uneven illumination that may result and, more commonly, because they reduce illumination efficiency. The quality of the light generated by such dashboard lamps is diminished because much of the light that is generated is wasted by being emitted in a lateral direction. The forwardly-emitted light is not efficiently produced.

LED chips are also used as the light source in dashboard lighting applications. However, because the energy emitted from LEDs tends to be low, and because light from LED chips is usually emitted in four directions, the problem of inefficient light generation is even more of a concern with LEDs than with ordinary lamps. It is particularly difficult to get enough output from the LEDs to be clearly visible through black dashboard covers that are currently popular in the automotive industry. Individual LED chips are not bright enough to illuminate a desired area through such dashboard covers, particularly when "heads-up" displays are used.

Efforts to overcome the problem of laterally-emitted light include the placement of plastic funnels over either the conventional lamps or the LEDs. This solution, however, is not satisfactory. The light in such systems is typically not all contained within the funnel, leaving inefficiencies in producing light at the plane of the illuminated object. In addition, such funnels are typically colored white which scatters light in all directions and thus produces additional inefficiencies.

No known device satisfactorily provides the efficient generation of sufficiently bright light for use in localized illumination in applications, such as, automobile dashboard lighting.

SUMMARY OF THE INVENTION

Briefly, the present invention provides illumination apparatus having a light source at least partially disposed in a first plane; a total internal reflection optical element disposed over the light source; and a light pipe disposed over the light source and the total internal reflection optical element and extending to a second plane different from the first plane, wherein light emitted from the light source is collected by the total internal reflection optical element and directed in a single direction through the light pipe, which channels the light to the second plane so that the light emitted by the light source is maximized at the second plane.

Advantageously, the illumination apparatus maximizes the brightness of an object, such as an icon, digit, or other figure, requiring localized illumination by collecting, redirecting, and channeling all or most of the light from a light source to a single plane at or proximate the icon, digit, or figure.

BRIEF DESCRIPTION OF THE DRAWINGS

For a better understanding of the invention, reference is made to the following description of an exemplary embodiment thereof, and to the accompanying drawings, wherein:

FIG. 1a is a perspective view of an exemplary circuit board used in an illumination apparatus constructed in accordance with the present invention;

FIG. 1b is a plan view of an exemplary LED arrangement mounted on the circuit board of FIG. 1a;

FIG. 2 is a perspective view of an exemplary display housing mounted over the LED arrangement of FIG. 1b;

FIG. 3a is a side view of an exemplary total internal reflection lens used in an illumination apparatus of the present invention;

FIG. 3b is a perspective view of an exemplary light pipe used in an illumination apparatus of the present invention;

FIG. 4a is a cross-sectional front view of the light pipe shown in FIG. 3b with a total internal reflection lens mounted therein;

FIG. 4b is a cross-sectional side view of the light pipe shown in FIG. 3b with a total internal reflection lens mounted therein;

FIG. 5 is a cross-sectional front view of the light pipe shown in FIG. 3b, with a total internal reflection lens mounted therein, mounted over an LED;

FIG. 6 is a cross-sectional side view of the light pipe shown in FIG. 5;

FIG. 7 is a cross-sectional side view of an exemplary alternative light pipe;

FIG. 8 is a perspective view of another exemplary alternative light pipe;

FIG. 9 is a plan view of an exemplary cover for a light pipe;

FIG. 10 is a cross-sectional front view of an exemplary alternative illumination apparatus of the present invention;

FIG. 11 is a partially cut-away perspective view of another exemplary alternative illumination apparatus of the present invention;

FIG. 12 is a side view of an exemplary illumination apparatus of the present invention in an automobile dashboard;

FIG. 13 is a perspective view of another exemplary alternative illumination apparatus of the present invention;

FIG. 14 is a front view of another exemplary alternative illumination apparatus of the present invention;

FIG. 15 is a side view of the illumination apparatus of FIG. 14;

FIG. 16 is perspective view of the illumination apparatus of FIG. 14; and

FIG. 17 is a front view of an automobile dashboard using localized illumination provided according to the present invention.

DETAILED DESCRIPTION

FIG. 1 shows an exemplary circuit board 10, with electrical connecting lines 11 formed thereon, used in an illumination apparatus constructed in accordance with the present invention. Electrical connecting lines 11 are formed in any desired pattern and in a conventional manner on circuit board 10. In the illustrated exemplary embodiment, electrical connecting lines 11 are arranged to supply power for a digital display. The light source for the display are LEDs although conventional lamps may also be used. Surface 12 of circuit board 10 is layered with the maximum amount of metal, or other reflective material, possible in order to provide maximum reflection of LED light off circuit board 10. This is done so that the light reflected off surface 12 can be gathered and redirected in the forward direction. Surface 12 acts like a mirror in this respect.

FIG. 1b shows an exemplary LED arrangement 15. LED arrangement 15 is adapted to be mounted on circuit board 10 in the desired pattern. A plurality of LEDs 16 are mounted on a common D/A (i.e., die attached) pad 17 and connected by wires 18 to common wire bond pad 19. The LEDs 16 may also be mounted on individual pads 17 on the board 10 and also connected by wires 18 to individual wire bond pads 19.

FIG. 2 shows an exemplary digital display housing 20 adapted to be mounted over LED arrangement 15 on circuit board 10. Digital display housing 20 has placement apertures 21 formed therethrough. Digital display housing 20, LED arrangement 15, and circuit board 10 are assembled such that placement apertures 21 are located directly above LEDs 16 on circuit board 10. One or more LEDs 16 may be accessible through a single placement aperture 21.

The problems of hot spots and insufficient illumination from LEDs 16 through placement apertures 21 are overcome by the placement of an optical element, such as a TIR lens, which, in the exemplary embodiment, is mounted in a light pipe, over at least one LED 16. FIG. 3a is a side view of an exemplary TIR lens 25. Light beams 26 emitted laterally from LED 16, over which lens 25 is placed, are redirected vertically by lens 25 according to known principles of TIR lenses. U.S. Pat. No. 5,404,869, issued to Parkyn, Jr. et al. provides a discussion of the principles involved with TIR lenses, and describes a device suitable for use in the present invention. The '869 patent is incorporated herein by reference for its teachings on TIR lenses and its description of exemplary devices.

To mount TIR lens 25 over LED 16, TIR lens 25 is first placed inside a light pipe, and the light pipe is then mounted over LED 16. FIG. 3b show an exemplary light pipe 30 that has a tapered bottom section 31 that terminates in bottom end 32 and a top 33. Light pipe 30 is designed to fit into placement aperture 21 and over at least one LED 16.

Lens 25 is mounted within light pipe 30 as shown in FIGS. 4a and 4b. In the illustrated embodiment, light pipe 30 is hollow and open at both bottom end 32 and top 33. Light pipe 30 is formed of a transparent material such as polycarbonate or acrylic. Temperature tolerant materials should be used for light pipe 30 in applications where temperature extremes are expected.

The dimensions of light pipe 30, and TIR lens 25 within it, are determined by the location of LEDs 16 on circuit board 10 under digital display housing 20 and by certain mechanical restraints. The mechanical constraints include, for example, the height from the surface of circuit board 10 to the top of placement aperture 21, the desired shape of the illuminated area, and the allowable width of placement aperture 21. This and other data, such as indices of refraction, are used to obtain (for example, via computer-aided calculation and analysis) the desired overall TIR design according to methods known in the art as described in U.S. Pat. No. 5,404,869 which has been incorporated herein by reference.

FIG. 5 is a cross-sectional front view of light pipe 30 having TIR lens 25 mounted therein and being placed in position over LED 16. FIG. 6 is a cross-sectional side view of light pipe 30 and TIR lens 25 over LED 16.

As shown in FIG. 5, light beams 26 emitted laterally from LED 16 are redirected vertically by TIR lens 25. Light beams such as beam 27 emitted vertically from LED 16 pass through TIR lens 25 without directional change. Beams such as beam 28 that are emitted down from LED 16 are reflected off surface 12 of circuit board 10, which is metallized to act as a mirror. Reflected beam 28 then strikes TIR lens 25, in effect, as a laterally emitted beam from LED 16. Beam 28 is then redirected vertically with the other beams 26, 27. In this manner, light from LED 16 is maximized at the plane defined by top 33 of light pipe 30. Using the present invention in the illustrated embodiment, the individual bars or elements of the digits in display housing 20, represented by placement apertures 21, are illuminated brightly enough for automobile dashboard applications. Each LED 16 in each placement aperture 21 may be turned on and off individually as desired.

Use of the present invention for a digital display is only one of a variety of applications of the present invention. In other applications, alternative embodiments of the individual elements, such as light pipe 30, may be used. For example, as shown in FIGS. 7 and 8, light pipe 30 may be configured so as to have a constricting or tapered shape. In FIG. 7, light pipe 30 is conical with bottom end 32 having the largest diameter. TIR lens 25 is disposed at the bottom of light pipe 30 where it gathers the output from LED 16 and redirects it up through light pipe 30. Because of the taper in light pipe 30, all of the light is then channeled to a smaller diameter plane at top 33. Since the amount of light is substantially conserved in light pipe 30 and funnelled to a smaller diameter, the brightness of the light at the plane at top 33 is higher than if light pipe 30 were not tapered and top 33 had the same diameter as bottom end 32. More light is emitted per unit area in such a design.

Similarly, FIG. 8 shows a tapered structure for light pipe 30 in a pie-shaped design. LED 16 and TIR lens 25 are contained in bottom section 31 of light pipe 30. Light pipe 30 has the largest horizontal cross-sectional plane at bottom end 32 and tapers to its narrowest cross section at top 33. As in FIG. 7, the LED light is collected and redirected by TIR lens 25 and then channeled to a smaller diameter plane at top 33, where the light is effectively brighter.

Another exemplary application for the present invention is the illumination of icons. This may be accomplished in several ways. FIG. 9 illustrates an exemplary cover 40 adapted to be disposed over top 33 of light pipe 30. Cover 40 may be shaped to match the shape of top 33 and may be integrally molded to top 33. Cover 40 may also be a film placed over top 33. Further, cover 40 may be integrally formed as part of light pipe 30 so that light pipe 30 is hollow but closed at top 33.

Cover 40 has an icon 41 configured therein. Icon 41 will be illuminated to convey information to a viewer. In the illustrated embodiment, icon 41 is a gas pump for use in an automobile dashboard display. Thus, in this case, the driver of an automobile may be alerted of a low tank of gas when icon 41 illuminates.

Cover 40 may be constructed of the same material as light pipe 30, with icon 41 cut or stamped out of cover 40. Alternatively, cover 40 may be molded with icon 41 therein. Cover 40 may also be tapered to a raised plane in which icon 41 is configured. When illuminated, light emitted from LED 16 is collected by TIR lens 25 and directed through light pipe 30, which channels the light to the plane at cover 40 over top 33. All of the LED light is emitted through icon 41, creating a bright, visible feature.

In all of the embodiments discussed herein, and as described above, a plurality of LEDs 16 may be placed within a single light pipe 30. As shown in FIG. 10, six LEDs 16 are disposed under TIR lens 25 within light pipe 30. LEDs 16 may be all of the same color, creating added brightness by the plural number of light sources. Alternatively, some or all of LEDs 16 may be of different colors, to be illuminated separately or in combination to create different colors for illumination.

For example, as shown in FIG. 11, icon 41 of a gas tank in cover 40 atop light pipe 30 may be illuminated with green light from the LEDs when the gas tank is full. Circuit board 10 may be programmed or controlled to illuminate only green LEDs 16a and 16b. As the tank empties, yellow LEDs 16c and 16d may be illuminated such that the driver sees a change in the color of icon 41 from green to yellow. When the tank is very low in fuel, red LEDs 16e and 16f may be illuminated such that the icon changes to red. Alternatively, only red and green LEDs 16a, 16b, 16e, and 16f may be used, all of which can be activated to shine in combination to create a yellow color for icon 41 at the desired time. This combined use of colored light from the LEDs may avoid excess material and energy use, eliminating the need for separate colored LEDs such as yellow LEDs 16c and 16d.

As noted above, the multicolor LEDs 16 may also be used with the digital display housing 20 discussed above. So, for example, in an automobile dashboard application, the multicolor LEDs 16 can be used to illuminate a digital display of the car speed, e.g., green below 55 miles per hour (mph), yellow between 55 and 65 mph, and red above 65 mph.

Another use of the present invention in an automobile dashboard application may be to have several light pipes 30, with LEDs 16 underneath them, arranged in an arc behind the numbers on an analog speedometer for illumination. FIG. 12 shows an exemplary illumination apparatus with light pipe 30 mounted in an automobile dashboard 61. Icon 41 becomes visible when LEDs 16 (not shown) beneath light pipe 30 are illuminated.

FIG. 13 illustrates another way of illuminating icon 41 using the present invention. The figure shows that an entirely separate piece 45 with icon 41 configured therein may be used, instead of cover 40, in combination with light pipe 30. In this case, light pipe 30 acts as a backlight, maximizing the light at the plane at top 33 for illumination of icon 41. Separate piece 45 is spaced apart from light pipe 30 and may be a part integral to the display structure itself, such as an automobile dashboard, with light pipe 30 illuminating it from behind.

FIGS. 14 and 15 show an alternative illumination apparatus wherein a lens 50 is disposed over top 33 of light pipe 30. Lens 50 may further narrow the plane in which light from LEDs 16 are concentrated, thus enhancing the brightness of light at that plane. Lens 50 may be a simple cylindrical lens or a flat holographic lens. In the latter case, the holographic lens is used to narrow the field of view instead of as a diffuser to spread out the field of view.

Using lens 50 in combination with light pipe 30 is particularly applicable to situations in which the field of view is well-defined. For example, in an automobile, because the driver's eyes must be below the roof of the car and above the steering wheel, there is a predefined area in which the image may be focused. By narrowing the plane of focus to this defined area, it is possible to further brighten an illuminated icon 41.

FIG. 16 illustrates use of lens 50 on light pipe 30 to focus light at the plane at which a separated icon 41 is located. Alternatively, of course, icon 41 may be formed on a cover 40 of light pipe 30 beneath lens 50, such that the image of icon 41 is focused to the desired plane.

The overall effect of the use of the present invention is illustrated in FIG. 17 which shows an automobile dashboard using localized illumination. Icons 41 are visible through a black dashboard cover/panel 61 because of the added brightness contributed by illumination apparatus of the present invention.

The illumination apparatus of the present invention is not used to image LED 16. Similarly, the light from LED 16 is not projected. Rather, the light from LED 16 is collected and directed to a single plane to maximize the output of LED 16 in automotive dashboard lighting and other applications.

The embodiments described herein are merely illustrative of the principles of the present invention. Various modifications may be made thereto by persons ordinarily skilled in the art, without departing from the scope or spirit of the invention.

For example, although the embodiments discussed herein pertain to use in an automobile dashboard, embodiments of the invention useful in other applications, such as traffic lights, computers, cameras, video cameras, stereos, and household appliances, are considered to be within the scope of the invention.

Further, as noted above, alternative embodiments of the individual elements may be used. For example, light pipe 30 may be hollow with a closed top 33 and used in combination with lens 50, cover 40 and/or separate piece 45.

Further, the light emitted by the light source can include radiation having wavelengths outside the visible light spectrum, such as, infrared and ultraviolet. In such case, the increased visibility of an object to be viewed can be accomplished via a different physical reaction, e.g. incandescence, fluorescence, etc.

What is claimed is:

1. Illumination apparatus, comprising:
   (a) a light source at least partially disposed in a first plane;
   (b) a total internal reflection optical element disposed over the light source; and
   (c) a light pipe disposed over the light source and the total internal reflection optical element and extending to a second plane different from the first plane,
wherein light emitted from the light source is collected by the total internal reflection optical element and directed in a single direction through the light pipe, which channels the light to the second plane so that the light emitted by the light source is maximized at the second plane.

2. The illumination apparatus of claim 1, wherein the light source is a light emitting diode.

3. The illumination apparatus of claim 1, wherein the light source comprises a plurality of light emitting diodes.

4. The illumination apparatus of claim 3, wherein at least some of the light emitting diodes are of different colors from one another.

5. The illumination apparatus of claim 1, wherein the light pipe has a tapered configuration.

6. The illumination apparatus of claim 1, wherein the light pipe is configured to have the largest cross-sectional area at the end of the light pipe disposed in the first plane and the narrowest cross-sectional area at the end of the light pipe disposed in the second plane.

7. The illumination apparatus of claim 1, further comprising a cover that is at least partially translucent disposed in the second plane over the light pipe.

8. The illumination apparatus of claim 7, wherein the cover has an icon configured therein, such that said icon is illuminated by the light emitted from the light source.

9. The illumination apparatus of claim 7, wherein the cover is integrally molded to the light pipe.

10. The illumination apparatus of claim 1, further comprising a cover that is at least partially translucent and has an icon configured therein, said cover being disposed in a third plane over the light pipe and apart from the light pipe, such that the icon is illuminated by the light emitted from the light source to the second plane.

11. The illumination apparatus of claim 1, wherein the light pipe has a closed end at the second plane, said closed end being at least partially translucent.

12. The illumination apparatus of claim 11, wherein the closed end of the light pipe has an icon configured therein, such that said icon is illuminated by the light emitted from the light source.

13. The illumination apparatus of claim 12, further comprising a lens disposed in the second plane over the closed end of the light pipe so that the icon is illuminated by the light emitted by the light source and the image of the icon is focused by the lens to a third plane apart from the light pipe.

14. The illumination apparatus of claim 11, further comprising a cover that is at least partially translucent and has an icon configured therein, said cover being disposed in a third plane over the light pipe and apart from the light pipe, such that the icon is illuminated by the light emitted from the light source to the second plane.

15. The illumination apparatus of claim 11, further comprising: a) a lens disposed in the second plane over the closed end of the light pipe to focus light emitted from the light source at a third plane apart from the light pipe and b) a cover that is at least partially translucent and has an icon configured therein, said cover being disposed in the third plane such that the icon is illuminated by the light emitted from the light source and focused by the lens.

16. The illumination apparatus of claim 1, further comprising a lens disposed in the second plane over the light pipe.

17. The illumination apparatus of claim 16, wherein the lens is a simple cylindrical lens.

18. The illumination apparatus of claim 16, wherein the lens is a holographic lens.

19. The illumination apparatus of claim 16, further comprising: a) a lens disposed in the second plane over the light pipe to focus light emitted from the light source at a third plane apart from the light pipe and b) a cover that is at least partially translucent and has an icon configured therein, said cover being disposed in the third plane such that the icon is illuminated by the light emitted from the light source and focused by the lens.

20. The illumination apparatus of claim 1, further comprising: a) a lens disposed in the second plane over the light pipe and b) a cover that is at least partially translucent and has an icon configured therein, said cover being disposed between the lens and the light pipe so that the icon is illuminated by the light emitted by the light source and the image of the icon is focused by the lens to a third plane apart from the light pipe.

21. The illumination apparatus of claim 1, wherein the light source is mounted on a substrate that is at least partially reflective, such that said substrate reflects light from the light source to the total internal reflection optical element.

22. Apparatus for use in an illuminated display, comprising:
   (a) a light emitting diode mounted on a metallized substrate; and
   (b) a total internal reflection lens mounted over the light emitting diode that collects light emitted from the light emitting diode and light reflected from the metallized substrate and directs the light in a single direction.

23. The apparatus of claim 22, further comprising:
   (a) a light pipe disposed over the light emitting diode and the total internal reflection lens, said light pipe having walls extending from the substrate to a plane above the substrate, such that directed light from the total internal reflection lens is channeled through the light pipe to said plane; and
   (b) a lens disposed in said plane over the light pipe that focuses the channeled light to a respective second plane.

24. The apparatus of claim 22, further comprising:
   (a) a light pipe disposed over the light emitting diode and the total internal reflection lens, said light pipe having walls extending from the substrate to a plane above the substrate, such that directed light from the total internal reflection lens is channeled through the light pipe to said plane; and
   (b) a cover disposed in said plane over the light pipe, said cover having an icon configured therein, such that the icon is illuminated by the light from the light emitting diode; and (c) a lens disposed over the cover of the light pipe that creates a focused image of the icon so that the light emitted by the light emitting diode is maximized at said focused image.

25. The apparatus of claim 22, further comprising:

(a) a light pipe disposed over the light emitting diode and the total internal reflection lens, said light pipe having walls extending from the substrate to a plane above the substrate and having a closed end, with an icon configured therein, at said plane, such that directed light from the total internal reflection lens is channeled through the light pipe to said plane and the icon is illuminated by the light from the light emitting diode; and (b) a lens disposed over the closed end of the light pipe that creates a focused image of the icon so that the light emitted by the light emitting diode is maximized at said focused image.

26. An illuminated display, comprising:

(a) a display panel having at least one symbol formed therein for viewing by an observer, and (b) an illumination device that has a light source, an optical element that collects light from the light source and directs the light in one direction using total internal reflection, and a light pipe that channels the light from the optical element to illuminate the symbol in the display panel.

27. The display of claim 26, wherein the optical element comprises a base upon which the light source is mounted that reflects light emitted from the light source.

28. The display of claim 26, wherein the light pipe is configured to channel light from the optical element to illuminate the symbol with increased brightness.

29. The display of claim 26, wherein the light pipe is configured to channel light from the optical element to illuminate the symbol with increased intensity.

30. The display of claim 26, wherein the light pipe is mounted in the display panel and has the symbol formed therein.

31. The display of claim 26, wherein the light pipe has a lens to focus the channeled light to illuminate the symbol.

32. The display of claim 26, wherein the light pipe is mounted in the display panel and has the symbol formed therein and has a lens formed over the symbol to focus the image of the symbol to a respective plane apart from the display panel.

* * * * *